United States Patent
Iino et al.

(10) Patent No.: US 10,690,187 B2
(45) Date of Patent: Jun. 23, 2020

(54) ENVELOPING LAYER-COATED SLIDE BEARING AND DRIVE MODULE

(71) Applicant: SEIKO INSTRUMENTS INC., Chiba-shi, Chiba (JP)

(72) Inventors: Akihiro Iino, Chiba (JP); Tatsumi Yamada, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 0 days.

(21) Appl. No.: 15/953,099

(22) Filed: Apr. 13, 2018

(65) Prior Publication Data

US 2018/0306240 A1    Oct. 25, 2018

(30) Foreign Application Priority Data

Apr. 19, 2017  (JP) .................................. 2017-082859
Dec. 26, 2017  (JP) .................................. 2017-250165

(51) Int. Cl.

| | | |
|---|---|---|
| *F16C 33/20* | (2006.01) | |
| *F16C 17/02* | (2006.01) | |
| *F16C 13/00* | (2006.01) | |

(52) U.S. Cl.

CPC .......... *F16C 33/201* (2013.01); *F16C 13/006* (2013.01); *F16C 17/02* (2013.01); *F16C 33/205* (2013.01); *F16C 2208/10* (2013.01); *F16C 2208/12* (2013.01); *F16C 2208/20* (2013.01)

(58) Field of Classification Search
CPC ........ F16C 13/00; F16C 13/02; F16C 13/006; F16C 17/02; F16C 33/201; F16C 33/205; F16C 2208/10; F16C 2208/12; F16C 2208/20; F16C 2324/16; F16C 2326/58
See application file for complete search history.

(56) References Cited

U.S. PATENT DOCUMENTS

| | | | | |
|---|---|---|---|---|
| 1,743,100 A | * | 1/1930 | Blackburn ............... | H02G 1/02 105/150 |
| 3,400,988 A | * | 9/1968 | Hudson ............. | B29C 45/14311 16/46 |
| 4,602,875 A | | 7/1986 | Doerr et al. ................... | 394/547 |
| 4,893,946 A | | 1/1990 | Tesh et al. ..................... | 384/549 |

(Continued)

FOREIGN PATENT DOCUMENTS

| | | |
|---|---|---|
| CN | 200961633 | 10/2007 |
| CN | 105114460 | 12/2015 |

(Continued)

OTHER PUBLICATIONS

United States Office Action dated Jul. 23, 2019 in U.S. Appl. No. 16/406,756.

(Continued)

*Primary Examiner* — Phillip A Johnson
(74) *Attorney, Agent, or Firm* — Adams & Wilks

(57) ABSTRACT

An enveloping layer-coated slide bearing includes a slide bearing having a bearing surface formed in a cylindrical shape, and a first enveloping layer composed of a thermoplastic elastomer formed on and directly contacting an outer circumferential surface of the slide bearing. In another arrangement, a second enveloping layer is interposed between the first enveloping layer and the slide bearing and directly contacts the outer circumferential surface of the slide bearing.

12 Claims, 9 Drawing Sheets

(56) References Cited

U.S. PATENT DOCUMENTS

| | | | | |
|---|---|---|---|---|
| 5,417,499 A * | 5/1995 | Jacques | ............... | F16C 33/20 |
| | | | | 384/298 |
| 5,688,054 A | 11/1997 | Rabe | ............... | 384/295 |
| 6,482,140 B1 | 11/2002 | Takatsu | ............... | 492/31 |
| 6,540,068 B1 * | 4/2003 | Wesson | ............... | E05D 15/063 |
| | | | | 193/35 R |
| 2009/0087126 A1 * | 4/2009 | Hagan | ............... | F16C 33/201 |
| | | | | 384/26 |
| 2016/0222701 A1 | 8/2016 | Goldmann | ............... | 81/6 |

FOREIGN PATENT DOCUMENTS

| | | |
|---|---|---|
| CN | 105980722 | 9/2016 |
| DE | 102014224310 | 6/2016 |
| JP | 6087717 | 12/1994 |
| JP | 07208462 | 8/1995 |

OTHER PUBLICATIONS

Chinese Office Action together with English-language machine translation of Chinese Patent Application No. 2018103428033 dated Apr. 22, 2020.

* cited by examiner

ENVELOPING LAYER-COATED SLIDE BEARING AND DRIVE MODULE

CROSS-REFERENCE TO RELATED APPLICATION

Priority is claimed on Japanese Patent Application No. 2017-082859, filed Apr. 19, 2017, and Japanese Patent Application No. 2017-250165, filed Dec. 26, 2017, the contents of which are incorporated herein by reference.

BACKGROUND OF THE INVENTION

Field of the Invention

The present invention relates to an enveloping layer-coated slide bearing and a drive module.

Description of Related Art

For example, as a use of a rolling bearing, conveying a conveyance object such as a bill, a ticket, or the like, using an outer ring of a rolling bearing, or rolling the rolling bearing along a contact object as a wheel of a moving body is known. In this case, in order to increase a frictional force with a conveyance object or a contact object with an outer circumferential surface of the outer ring or decrease sound (noise) when an outer ring is operated while in rolling contact, the outer ring is coated with a urethane rubber. The urethane rubber has good wear resistance, and further, can be strongly adhered and fixed to the outer ring. A manufacturing process of mounting the urethane rubber on the outer ring is as follows.

First, the outer circumferential surface of the outer ring of the rolling bearing is processed to become rough through sandblast processing, and an adhesive agent is applied on the outer circumferential surface that is processed to become rough. Next, the rolling bearing is set in a mold, a urethane raw material (a liquid) flows between the outer circumferential surface and the mold, and molding is performed by applying a pressure to the mold. Next, the urethane raw material is held in the mold at a high temperature for a predetermined time (about half of a day to one day according to hardness). A high temperature is applied to the adhesive agent and the urethane rubber is vulcanized and adhered to the outer circumferential surface while curing the urethane rubber at a high temperature. After vulcanized adhesion, the outer circumferential surface of the urethane is accurately finished with a predetermined dimension through polishing. Accordingly, the outer circumferential surface of the outer ring of the rolling bearing is coated with the urethane rubber (for example, see Japanese Utility Model Publication No. H06-87717).

SUMMARY OF THE INVENTION

However, the rolling bearing of the related art has the following problems.

That is, the urethane rubber should be cured in the mold for a long time, application of the adhesive agent to the outer circumferential surface of the outer ring is time-consuming, and the outer circumferential surface of the urethane should be accurately finished at a predetermined dimension through polishing after curing of the urethane rubber.

Accordingly, when mass production of the rolling bearing having the outer circumferential surface coated with the urethane rubber is performed, a great amount of equipment for coating the outer circumferential surface with the urethane rubber should be provided, and equipment cost is increased. In addition, a process in which an outer circumferential surface of the outer ring is processed to become rough through sandblast or a process of applying an adhesive agent to the outer circumferential surface that is processed to become rough is needed. For this reason, it is difficult to manufacture the rolling bearing coated with the urethane rubber at a low cost in large quantities.

In consideration of the above-mentioned circumstances, an aspect according to the present invention is to provide an enveloping layer-coated slide bearing and a drive module so that products can be manufactured at a low cost in large quantities.

In order to solve the above-mentioned problems, the present invention employs the following aspects.

(1) An enveloping layer-coated slide bearing according to an aspect of the present invention includes a slide bearing having a bearing surface formed in a cylindrical shape; and a first enveloping layer formed of a thermoplastic elastomer on an outer circumferential surface of the slide bearing.

According to the aspect of (1), for example, when the slide bearing is formed of a resin material, the first enveloping layer of the thermoplastic elastomer is insert-molded on the outer circumferential surface of the slide bearing through injection molding. Accordingly, the first enveloping layer is more strongly welded to the outer circumferential surface of the slide bearing through thermal fusion. Accordingly, separation of the first enveloping layer from the outer circumferential surface of the slide bearing can be prevented.

In addition, the first enveloping layer is more strongly fixed to the outer circumferential surface of the slide bearing through thermal fusion upon injection molding. Accordingly, a sandblast machining process or an applying process by an adhesive agent, which is necessary in the related art, may be unnecessary. Accordingly, the slide bearing can be manufactured at a low cost in large quantities.

Further, the first enveloping layer is more strongly fixed to the outer circumferential surface of the slide bearing through thermal fusion. Accordingly, when a conveyance object such as a bill, a ticket, or the like, is conveyed by the first enveloping layer or when the slide bearing rolls along the contact object as a wheel of the moving body, sound (noise) can be reduced by the first enveloping layer.

(2) In the aspect of (1), the slide bearing may be formed of a plastic such as polycarbonate, ABS resin, or an alloy material of the polycarbonate and the ABS resin.

According to the aspect of (2), the slide bearing is formed of a plastic. Accordingly, the plastic of the slide bearing may be an amorphous plastic. The amorphous plastic has a good property in thermal adhesiveness to the thermoplastic elastomer. Accordingly, when the first enveloping layer of the thermoplastic elastomer is injection-molded, the first enveloping layer of the thermoplastic elastomer can be appropriately thermally fused to the outer circumferential surface of the slide bearing. Accordingly, the first enveloping layer can be more strongly fixed to the outer circumferential surface of the slide bearing.

(3) In the aspect of (1), a second enveloping layer interposed between the outer circumferential surface of the slide bearing and the first enveloping layer may be further provided.

According to the aspect of (3), as the second enveloping layer is interposed between the outer circumferential surface of the slide bearing and the first enveloping layer, the first enveloping layer can be strongly fixed to the outer circumferential surface of the slide bearing via the second enveloping layer. That is, the second enveloping layer may be selectively formed of a material good in thermal adhesiveness to both members of the slide bearing and the first enveloping layer. Accordingly, the second enveloping layer can be strongly fixed to the outer circumferential surface of the slide bearing through thermal fusion. In addition, the first enveloping layer can be strongly fixed to the outer circumferential surface of the second enveloping layer through thermal fusion. Accordingly, the first enveloping layer can be strongly fixed to the outer circumferential surface of the slide bearing via the second enveloping layer.

(4) In the aspect of (3), the second enveloping layer may be formed of a material softer than the slide bearing, and the first enveloping layer may be formed of a material harder than the second enveloping layer.

According to the aspect of (4), the second enveloping layer is interposed between the slide bearing and the first enveloping layer.

In addition, the second enveloping layer is formed of a material softer than the slide bearing. Further, the first enveloping layer is formed of a material harder than the second enveloping layer. As the first enveloping layer is formed of the material harder than the second enveloping layer, a wear resistance and durability of the first enveloping layer can be secured.

Meanwhile, as the second enveloping layer is formed of the material softer than the slide bearing or the first enveloping layer, when the enveloping layer-coated slide bearing is driven, generation of sound (noise) can be minimized by the second enveloping layer and reduction in sound (noise) can be achieved.

(5) In the aspect of (3) or (4), a convex section swelling outward in a radial direction may be provided on an outer circumferential surface of one of the slide bearing and the second enveloping layer, on which the first enveloping layer is formed, at a center in an axial direction.

According to the aspect of (5), the convex section is formed on the outer circumferential surface of the second enveloping layer and the first enveloping layer is thermally fused to the convex section of the outer circumferential surface. Accordingly, the first enveloping layer is engaged with the convex section and exfoliation of the first enveloping layer from the outer circumferential surface of the second enveloping layer can be prevented by the convex section. Accordingly, separation of the first enveloping layer from the outer circumferential surface of the second enveloping layer can be securely prevented.

(6) In the aspect of any one of (3) to (5), the first enveloping layer may be formed of a thermoplastic elastomer filled from a gate, and the gate is formed as an opening larger than a thickness dimension of the first enveloping layer and disposed to overlap both of the first enveloping layer and the second enveloping layer in an axial direction.

According to the aspect of (6), the gate is more largely opened than the thickness dimension of the first enveloping layer. Further, the gate is disposed to overlap both of the second enveloping layer and the first enveloping layer in the axial direction. Accordingly, even when the thickness dimension of the first enveloping layer is reduced, the first enveloping layer can be appropriately formed.

Further, the coated outer circumferential section of the second enveloping layer can be filled with the thermoplastic elastomer at a high pressure. Accordingly, an adhesive force of both layers of the second enveloping layer and the first enveloping layer can be increased.

(7) A drive module according to an aspect of the present invention includes the enveloping layer-coated slide bearing of any one of the aspects (1) to (6).

According to the aspect of (7), as the above-mentioned enveloping layer-coated slide bearing is provided in the drive module, the drive module can be provided at a low cost while durability can be secured.

According to the aspect of the present invention, the first enveloping layer is formed of a thermoplastic elastomer on the slide bearing through injection molding. Accordingly, the enveloping layer-coated slide bearing can be manufactured at a low cost in large quantities.

DETAILED DESCRIPTION OF THE INVENTION

Hereinafter, embodiments according to the present invention will be described with reference to the accompanying drawings.

First Embodiment

Figure 1:
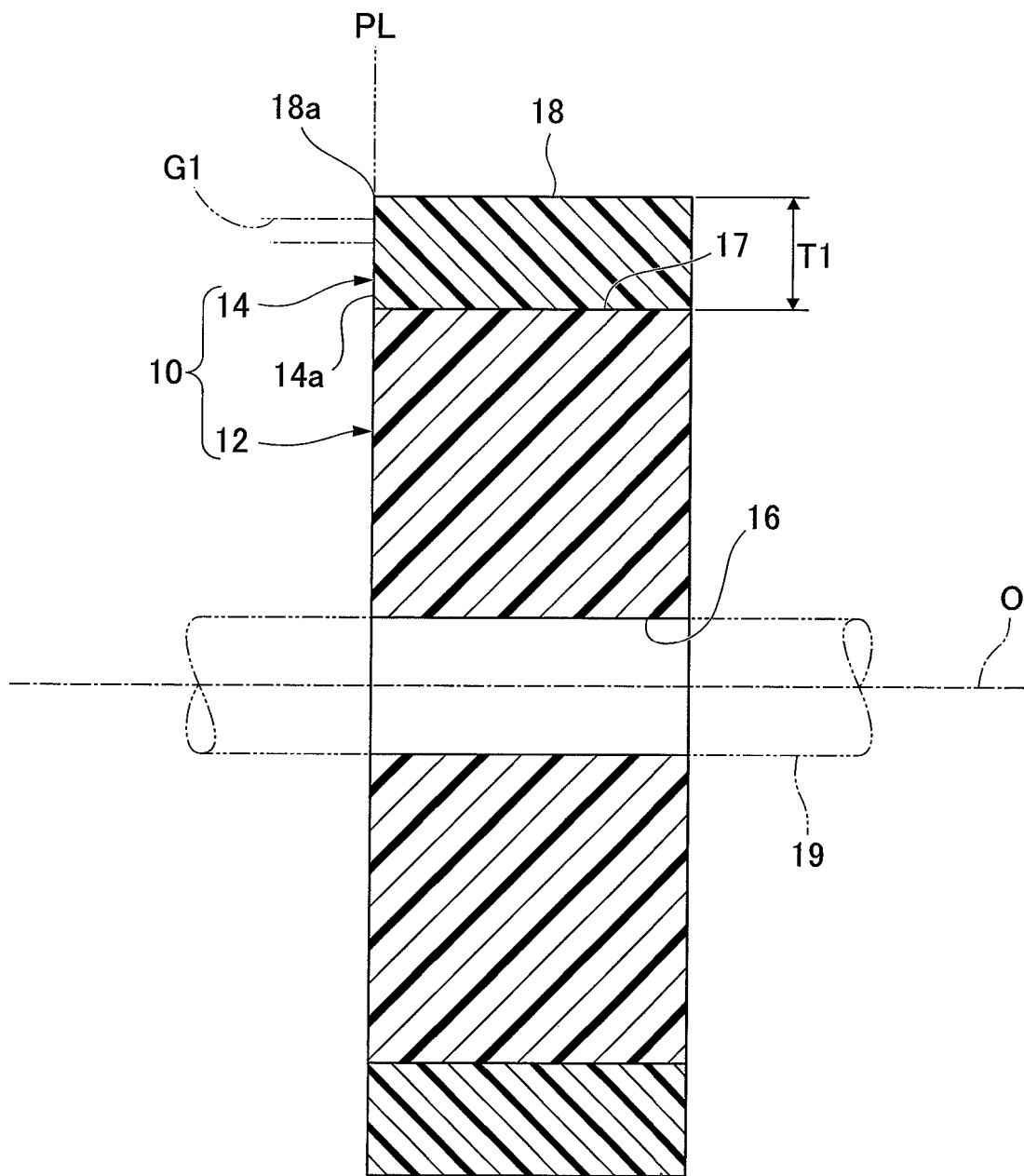
FIG. 1 is a cross-sectional view showing the enveloping layer-coated slide bearing according to a first embodiment of the present invention.

FIG. 1 is a cross-sectional view of an enveloping layer-coated slide bearing 10 according to a first embodiment.

As shown in FIG. 1, the enveloping layer-coated slide bearing 10 includes a slide bearing 12 and a first enveloping layer 14.

The slide bearing 12 has a bearing surface 16 formed in a cylindrical shape, and an outer circumferential surface 17. The bearing surface 16 is formed on an inner circumferential surface of the slide bearing 12 in an arc shape and rotatably fitted onto a support shaft 19. The slide bearing 12 is rotatably supported about the support shaft 19 serving as a shaft. The outer circumferential surface 17 is formed outside the slide bearing 12 in a radial direction at a predetermined interval with the bearing surface 16.

The bearing surface 16 and the outer circumferential surface 17 are formed coaxially with an axis O of the slide bearing 12.

The slide bearing 12 is formed of a plastic such as a hard plastic (amorphous plastic). Polycarbonate, ABS resin, an alloy material of polycarbonate and ABS resin, or the like, may be preferable as the amorphous plastic.

The slide bearing 12 can secure wear resistance of the bearing surface 16 with respect to the support shaft 19 because the slide bearing 12 is formed of, for example, a hard plastic.

A solid lubricant such as polytetrafluoroethylene (tetrafluorinate, PTFE) or the like is preferably added to the hard plastic.

The first enveloping layer 14 is formed on the outer circumferential surface 17 of the slide bearing 12. The first enveloping layer 14 is thermally fused to the outer circumferential surface 17 of the slide bearing 12 by insert molding through injection molding.

The first enveloping layer 14 is formed in an annular shape with a predetermined thickness dimension T1. In addition, the first enveloping layer 14 is set to have a widthwise dimension that is the same as a widthwise dimension of the slide bearing 12.

The first enveloping layer 14 is formed of a thermoplastic elastomer (TPE) on the outer circumferential surface 17 of the slide bearing 12 through injection molding. The thermoplastic elastomer has good thermal adhesiveness to the amorphous plastic that is a material for the slide bearing 12.

Styrenes (TPS), olefins (TPO), vinyl chlorides (PPVC), urethanes (TPU) or polyesters (TPEE) may be applied as the thermoplastic elastomer. In view of mechanical strength and wear resistance, urethanes (TPU), polyesters (TPEE) and styrenes (TPS) are preferable. More preferably, polyesters (TPEE) are exemplified as the thermoplastic elastomer.

Urethanes (TPU) are the best in wear resistance, but have problems in formability, and urethanes (TPU) have high hygroscopicity and should be sufficiently dried. Further, annealing is also necessary, and there is a problem in forming accuracy while manufacture thereof is time-consuming. In addition, among thermoplastic elastomers, urethanes are the best in mechanical strength and wear resistance. For this reason, urethanes are used when properties of mechanical strength or wear resistance are required in an enveloping layer 18.

Among thermoplastic elastomers, aside from urethanes, polyesters (TPEE) are the best in wear resistance and mechanical strength, and are also good in thermal adhesiveness to hard plastics. In addition, polyesters (TPEE) are optimal as a material for the enveloping layer 18 because they also have low hygroscopicity and a good forming property.

Here, polyesters (TPEE) are preferable as the thermoplastic elastomer of the first enveloping layer 14. Polyesters are good in wear resistance and mechanical strength and also good in thermal adhesiveness to the hard plastic (i.e., the slide bearing 12).

Thermal fusion is, for example, the thermoplastic elastomer of the first enveloping layer 14 is melted through heating of and adhesion to the hard plastic (the outer circumferential surface 17 of the slide bearing 12).

Accordingly, an effect upon two color formation is exhibited. In addition, polyesters (TPEE) are optimal as a material of the first enveloping layer 14 of the enveloping layer-coated slide bearing 10 because they also have lower hygroscopicity and a good forming property.

Here, the slide bearing 12 is formed of a hard plastic (amorphous plastic).

The amorphous plastic has a good property in thermal adhesiveness to the thermoplastic elastomer of the first enveloping layer 14. Accordingly, when the first enveloping layer 14 of the thermoplastic elastomer is formed by injection molding, the first enveloping layer 14 of the thermoplastic elastomer can be appropriately thermally fused to the outer circumferential surface 17 of the slide bearing 12. Accordingly, the first enveloping layer 14 can be more strongly fixed to the outer circumferential surface 17 of the slide bearing 12.

In addition, in view of minimization of sound (noise), durometer hardness A of the first enveloping layer 14 is desirably 75 to 95. For example, when the durometer hardness A is 92, it is particularly preferable in view of the fact that the sound (noise) is appropriately suppressed and the mechanical strength or the wear resistance of the first enveloping layer 14 is appropriately secured. When the durometer hardness A is less than 75, the mechanical strength or the wear resistance of the first enveloping layer 14 is considered to become a problem.

According to the enveloping layer-coated slide bearing 10, the slide bearing 12 is formed of, for example, a hard plastic (amorphous plastic). The first enveloping layer 14 of the thermoplastic elastomer is insert-molded on the outer circumferential surface 17 of the slide bearing 12 through injection molding.

Accordingly, the first enveloping layer 14 is strongly welded to the outer circumferential surface 17 of the slide bearing 12 through thermal fusion. Accordingly, separation of the first enveloping layer 14 from the outer circumferential surface 17 of the slide bearing 12 can be prevented.

In addition, the first enveloping layer 14 is strongly fixed to the outer circumferential surface 17 of the slide bearing 12 by thermal fusion upon injection molding. Accordingly, a sandblast machining process or an application process by an adhesive agent, which is required in the related art, may be unnecessary. Accordingly, the slide bearing can be manufactured at a low cost in large quantities.

Incidentally, when the first enveloping layer 14 is formed of a thermoplastic elastomer, the first enveloping layer 14 is insert-molded on the outer circumferential surface 17 of the slide bearing 12 through injection molding. The mold is used to form the first enveloping layer 14 through injection molding, and a gate G1 of the mold is disposed at a position corresponding to a coated side surface 14a of the first enveloping layer 14. As the inside (a cavity) of the mold is filled with the melted thermoplastic elastomer from the gate G1, the first enveloping layer 14 is insert-molded on the outer circumferential surface 17 of the slide bearing 12.

As the gate G1 of the mold is formed at a position corresponding to the coated side surface 14a of the first enveloping layer 14, a filling space of the thermoplastic elastomer can be shifted from a coated outer circumferential surface 18 of the first enveloping layer 14.

In addition, a parting line PL of the mold is disposed on, for example, the coated side surface 14a of the first enveloping layer 14 in an axis O direction of the slide bearing 12. The coated side surface 14a is formed in a concave section in one end 18a of the coated outer circumferential surface 18 with respect to the coated outer circumferential surface 18. The parting line PL is disposed at a position shifted from the coated outer circumferential surface 18.

In this way, the gate G1 or the parting line PL is shifted from the coated outer circumferential surface 18. Accordingly, generation of burrs generated when the mold is filled with the thermoplastic elastomer from the gate G1 or burrs generated by the parting line PL on the coated outer circumferential surface 18 can be prevented. Accordingly, post processing of removing the burrs from the coated outer circumferential surface 18 may be unnecessary.

Here, in the enveloping layer-coated slide bearing 10, as the first enveloping layer 14 is welded to the outer circumferential surface 17 of the slide bearing 12, the first enveloping layer 14 need not be adhered to the outer circumferential surface 17 of the slide bearing 12 by an adhesive agent. The following effect is obtained when no adhesive agent is interposed between the first enveloping layer 14 and the outer circumferential surface 17 of the slide bearing 12.

That is, in the case of a small enveloping layer-coated slide bearing, for example, the adhesive agent may not be applied to the outer circumferential surface of the slide bearing with a uniform thickness dimension due to painting nonuniformity of the adhesive agent when the first enveloping layer is adhered to the outer circumferential surface of the slide bearing by the adhesive agent. Meanwhile, in the case of the small enveloping layer-coated slide bearing, the thickness dimension of the first enveloping layer is considered to be less than 1.0 mm. In this state, when the adhesive agent is not applied on the outer circumferential surface of the slide bearing to the uniform thickness dimension, hardness of the first enveloping layer is considered to be irregular.

For this reason, when the conveyance object is conveyed by the small enveloping layer-coated slide bearing coated with the first enveloping layer or when the first enveloping layer rolls along the contact object, sound (noise) may occur and may become a cause of torque nonuniformity.

On the other hand, when the first enveloping layer 14 is welded to the outer circumferential surface 17 of the slide bearing 12, an adhesive agent may be unnecessary. Accordingly, even when the enveloping layer-coated slide bearing 10 is formed in a compact shape and the thickness dimension of the first enveloping layer 14 is less than 1.0 mm, hardness of the first enveloping layer 14 can be evenly held throughout the circumference.

Accordingly, even when the enveloping layer-coated slide bearing 10 is formed in a compact shape, generation of sound (noise) or causes of torque nonuniformity can be minimized when a conveyance object is conveyed by the enveloping layer-coated slide bearing 10 or the enveloping layer-coated slide bearing 10 is rolled along the contact object.

Further, while the example in which the first enveloping layer 14 is formed on the outer circumferential surface 17 of the slide bearing 12 by only welding has been described in the first embodiment, there is no limitation thereto. As another example, according to a use or a material of the enveloping layer-coated slide bearing 10, for example, the first enveloping layer 14 may be formed on the outer circumferential surface 17 of the slide bearing 12 through welding in combination with an adhesive agent.

Further, while the example in which the slide bearing 12 is formed of, for example, a hard plastic (amorphous plastic) has been described in the first embodiment, there is no limitation thereto. As another example, the slide bearing 12 may be formed by sintering, for example, a metal material. A bearing surface (a surface) of the slide bearing formed by sintering the metal material is formed to become rough. The thermoplastic elastomer melted in the concave section of the bearing surface is dissolved, and the thermoplastic elastomer is strongly fixed to the bearing surface by an anchor effect.

Figure 2:
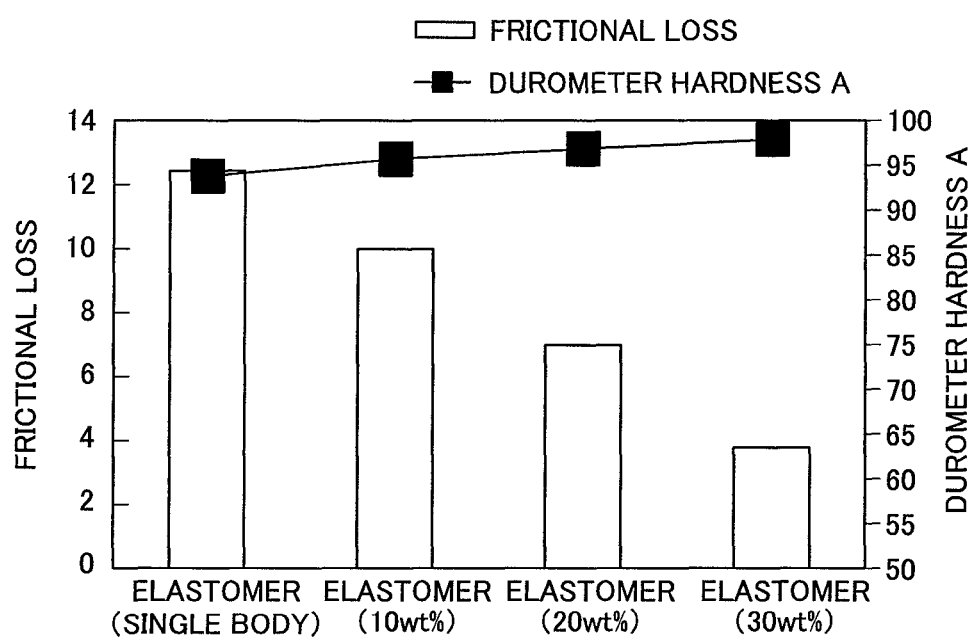
FIG. 2 is a graph showing properties of a state in which a potassium titanate fiber is contained in a first enveloping layer according to the first embodiment of the present invention.

Here, for example, in order to secure abrasion loss of the first enveloping layer 14, as shown in Table 1 and FIG. 2, the thermoplastic elastomer may contain a potassium titanate fiber.

Table 1 shows properties in a state in which the first enveloping layer 14 of the present invention contains the potassium titanate fiber. FIG. 2 is a graph showing properties in a state in which the first enveloping layer 14 contains the potassium titanate fiber.

In Table 1 and FIG. 2, a thermoplastic elastomer (polyesters (TPEE)) that does not contain the potassium titanate fiber is shown as an elastomer (a single body). The thermoplastic elastomer that contains the potassium titanate fiber at 10 wt % is shown as an elastomer (10 wt %).

In addition, the thermoplastic elastomer that contains the potassium titanate fiber at 20 wt % is shown as an elastomer (20 wt %). The thermoplastic elastomer that contains the potassium titanate fiber at 30 wt % is shown as an elastomer (30 wt %).

TABLE 1

| | | Elastomer (Single body) | Elastomer (10 wt %) | Elastomer (20 wt %) | Elastomer (30 wt %) |
|---|---|---|---|---|---|
| Tensile strength | Mpa | 12 | 13 | 18 | 23 |
| Bending strength | Mpa | 4 | 7 | 9 | 16 |
| Bending modulus of elasticity | Gpa | 0.05 | 0.13 | 0.21 | 0.44 |
| Izod notch | J/m | NB (Not broken) | NB (Not broken) | 158 | 208 |
| Durometer hardness A | | 94 | 96 | 97 | 98 |
| Abrasion loss vs glass plate | $10^{-3}$ cm$^3$ | 12.5 | 10.1 | 7.0 | 3.8 |

In Table 1 and FIG. 2, properties of the elastomer (single body), the elastomer (10 wt %), the elastomer (20 wt %) and the elastomer (30 wt %) are shown. When the thermoplastic elastomer contains the potassium titanate fibers of 10 wt %, 20 wt % and 30 wt %, the tensile strength can be increased from 12 Mpa to 13 Mpa, 18 Mpa and 23 Mpa.

In addition, the bending strength can be increased from 4 Mpa to 7 Mpa, 9 Mpa and 16 Mpa. Further, the bending modulus of elasticity can be increased from 0.05 GPa to 0.13 GPa, 0.21 GPa and 0.44 GPa.

In addition, the graph of FIG. 2 shows abrasion loss or durometer hardness A in a state in which the thermoplastic elastomer single body and thermoplastic elastomer contains the potassium titanate fibers at 10 wt %, 20 wt % and 30 wt %. As shown in FIG. 2 and Table 1, in a state in which the thermoplastic elastomer contains the potassium titanate fiber at 10 wt %, 20 wt % and 30 wt %, the durometer hardness A of the thermoplastic elastomer can be increased from 94 to 96, 97 and 98.

Further, as shown in FIG. 2 and Table 1, in a state in which the thermoplastic elastomer contains the potassium titanate fiber, abrasion loss of the thermoplastic elastomer can be decreased. Specifically, in a state in which the potassium titanate fibers at 10 wt %, 20 wt % and 30 wt % are contained, the abrasion loss of the thermoplastic elastomer can be reduced from $12.5 \times 10^{-3}$ cm$^{-3}$ to $10.1 \times 10^{-3}$ cm$^{-3}$, $7.0 \times 10^{-3}$ cm$^{-3}$ and $3.8 \times 10^{-3}$ cm$^{-3}$.

Here, the abrasion loss of the thermoplastic elastomer is measured by the reciprocal sliding test. In a reciprocal sliding test condition, a glass plate is selected as an opposite material, and a reciprocal sliding test is performed at a weight of 0.7 kg and a speed of 0.16 m/s for a time of 20 min.

Further, a content of the potassium titanate fiber is appropriately selected to correspond to a use of the enveloping layer-coated slide bearing 10.

(First Variant)

Next, an enveloping layer-coated slide bearing 20 will be described as a first variant of the first embodiment with reference to FIG. 3.

Figure 3:
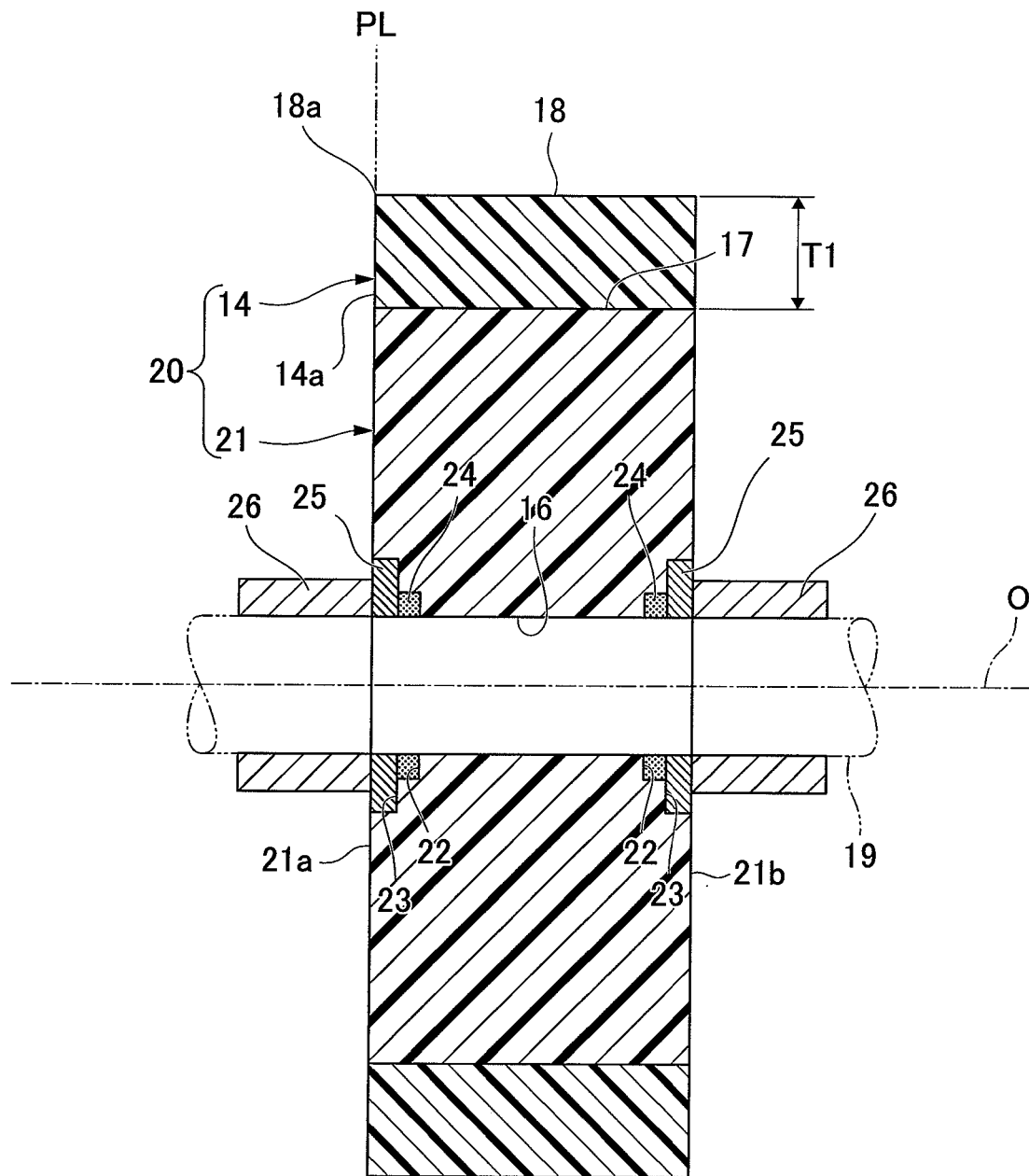
FIG. 3 is a cross-sectional view showing a first variant of the slide bearing with the enveloping layer according to the first embodiment of the present invention.

FIG. 3 is a cross-sectional view showing the first variant of the enveloping layer-coated slide bearing according to the first embodiment.

As shown in FIG. 3, the enveloping layer-coated slide bearing 20 may be formed by filling both side portions 21a and 21b of a slide bearing 21 with grease 24. Specifically, the slide bearing 12 has a first concave section 22 and a second concave section 23 that are coaxially formed on both of the side portions 21a and 21b. As an example, an outer diameter of the first concave section 22 is formed to be smaller than that of the second concave section 23.

The first concave section 22 is filled with the grease 24, and a sliding washer 25 is accommodated in the second concave section 23. As the sliding washer 25 is accommodated in the second concave section 23, an opening section of the first concave section 22 is closed by the sliding washer 25. Accordingly, a state in which the grease 24 is accumulated in the first concave section 22 can be held.

A cylindrical restriction section 26 is formed outside the sliding washer 25. The restriction section 26 is attached to the support shaft 19. Accordingly, the sliding washer 25 is held at the second concave section 23 by the restriction section 26.

Here, for example, when the restriction section 26 is formed of a metal, the sliding washer 25 is preferably formed of a resin material. As the grease 24 is accommodated in the first concave section 22, the enveloping layer-coated slide bearing 20 can be more appropriately rotated with respect to the support shaft 19.

(Second Variant)

Next, a second variant of a bearing 10 according to the first embodiment will be described.

Figure 4:
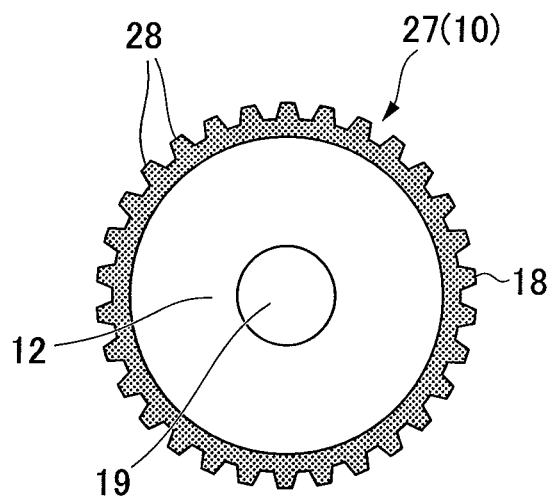
FIG. 4 is a side view showing a second variant of the bearing according to the first embodiment of the present invention.

FIG. 4 is a side view showing the second variant of the bearing 10 according to the first embodiment.

As shown in FIG. 4, while the example in which the first enveloping layer 14 is formed of thermoplastic elastomer as the bearing 10 of the first embodiment has been described, as another example, a plurality of teeth 28 for a gear may be formed on the coated outer circumferential surface of the first enveloping layer 14. Accordingly, the bearing 10 may be used as a gear 27. The gear 27 may be used as, for example, a small planetary gear (a planetary gear) in a planetary gear mechanism.

The gear 27 has the plurality of teeth 28 formed of a thermoplastic elastomer. Accordingly, a driving sound generated when the gear 27 is meshed with the bearing can be reduced.

In addition, the first enveloping layer 14 that forms the plurality of teeth 28 may be formed of a thermoplastic elastomer that has durometer hardness A of 95 or more in consideration of wear resistance, mechanical strength, or the like of the gear 27.

Figure 5:
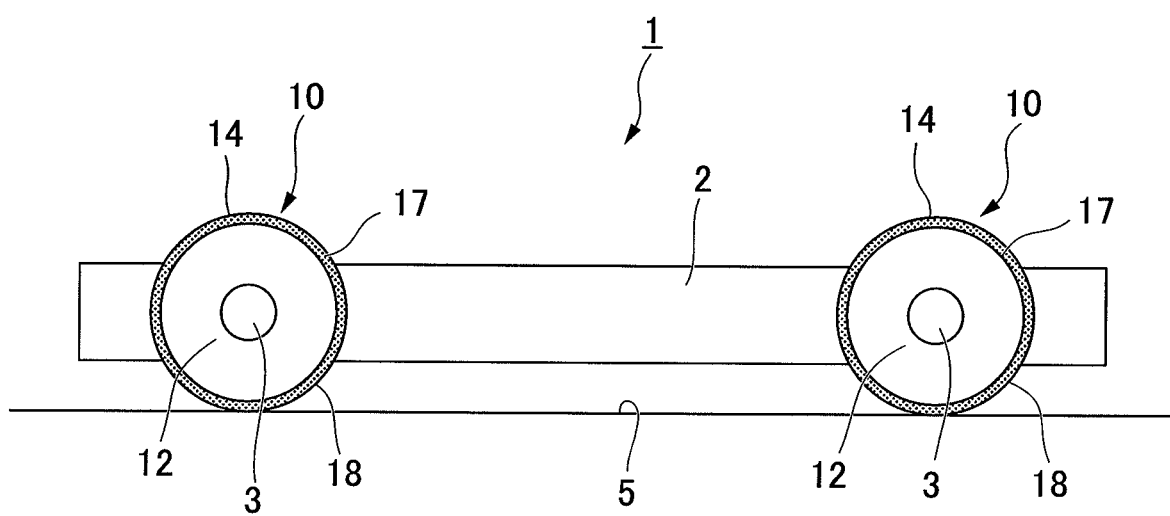
FIG. 5 is a side view showing a moving body including the enveloping layer-coated slide bearing with the enveloping layer according to the first embodiment of the present invention.

Next, an example of a use of the enveloping layer-coated slide bearing 10 of the first embodiment will be described with reference to FIG. 5. FIG. 5 is a side view showing a moving body 1 including the enveloping layer-coated slide bearing 10 according to the first embodiment.

As shown in FIG. 5, for example, the enveloping layer-coated slide bearing 10 is attached to the moving body (a drive module) 1 and used as a wheel.

The moving body 1 includes a main body section 2, and a plurality of enveloping layer-coated slide bearings 10 attached to both sides of the main body section 2. In the plurality of enveloping layer-coated slide bearings 10, the slide bearing 12 is rotatably supported by a support shaft 3.

The support shaft 3 is attached to the main body section 2. As the slide bearing 12 is fixed to the support shaft 3, the enveloping layer-coated slide bearing 10 is rotatably supported by the support shaft 3. That is, the plurality of enveloping layer-coated slide bearings 10 are used as a wheel.

The moving body 1 is disposed in a state in which the first enveloping layers 14 (specifically, the coated outer circumferential surfaces 18) of the plurality of enveloping layer-coated slide bearings 10 come in contact with a contact object 5. As the enveloping layer-coated slide bearings 10 roll over the contact object 5, the moving body 1 can move along the contact object 5.

Since the first enveloping layer 14 is provided on the enveloping layer-coated slide bearing 10, when the enveloping layer-coated slide bearing 10 moves while rolling on the contact object 5, sound (noise) can be reduced by the first enveloping layer 14.

In addition, since the first enveloping layer 14 is strongly engaged with the outer circumferential surface 17 of the slide bearing 12, separation of the first enveloping layer 14 from the outer circumferential surface 17 of the slide bearing 12 can be prevented.

In this way, as the plurality of enveloping layer-coated slide bearings 10 are provided on the moving body 1, the moving body 1 can be obtained at a low cost while securing durability.

In FIG. 5, while the example in which the first enveloping layer 14 of the enveloping layer-coated slide bearing 10 is rotated while in contact with the contact object 5 and the moving body 1 is moved along the contact object 5 has been described, there is no limitation thereto. As another example, the moving body 1 may be held in a fixed state, and the first enveloping layer 14 may come in contact with the contact object 5 to move the contact object 5 according to rotation of the first enveloping layer 14. A case in which the contact object 5 is a drawer in a desk corresponds to the another example.

In addition, as another example, the enveloping layer-coated slide bearing 10 may be applied to a wheelchair in which a traveling direction turns. When the enveloping layer-coated slide bearing 10 is applied to the wheelchair, the enveloping layer-coated slide bearing 10 can be turned to correspond to the traveling direction of the moving body 1.

Further, as an example of another use, the enveloping layer-coated slide bearing 10 is used in a conveyance apparatus (a drive module) for a bill, a ticket, or the like. That is, in the conveyance apparatus, the slide bearing 12 of the pair of enveloping layer-coated slide bearings 10 is attached to the support shaft 3, and the slide bearing 12 and the first enveloping layer 14 are rotatably supported by the support shaft. The pair of first enveloping layers 14 are disposed adjacent to each other. In this state, as the enveloping layer-coated slide bearings 10 are rotated, a bill, a ticket, or the like is sandwiched and conveyed between the pair of first enveloping layers 14.

Since the first enveloping layers 14 are formed on the slide bearing 12, when a bill, a ticket, or the like is conveyed while sandwiched between the first enveloping layers 14 of the enveloping layer-coated slide bearing 10, sound (noise) can be reduced by the first enveloping layers 14. In addition, since the first enveloping layer 14 is strongly engaged with the slide bearing 12, separation of the first enveloping layer 14 from the outer circumferential surface 17 of the slide bearing 12 can be prevented.

In this way, as the enveloping layer-coated slide bearing 10 is provided in the conveyance apparatus, the conveyance apparatus can be obtained at a low cost while durability can be secured.

Next, slide bearings of a second embodiment to a fifth embodiment will be described with reference to FIG. 6 to FIG. 9. Further, in the slide bearings of the second embodiment to the fourth embodiment, the same members as and similar members to those of the enveloping layer-coated slide bearing 10 of the first embodiment are designated by the same reference numerals and detailed description thereof will be omitted.

Second Embodiment

Figure 6:
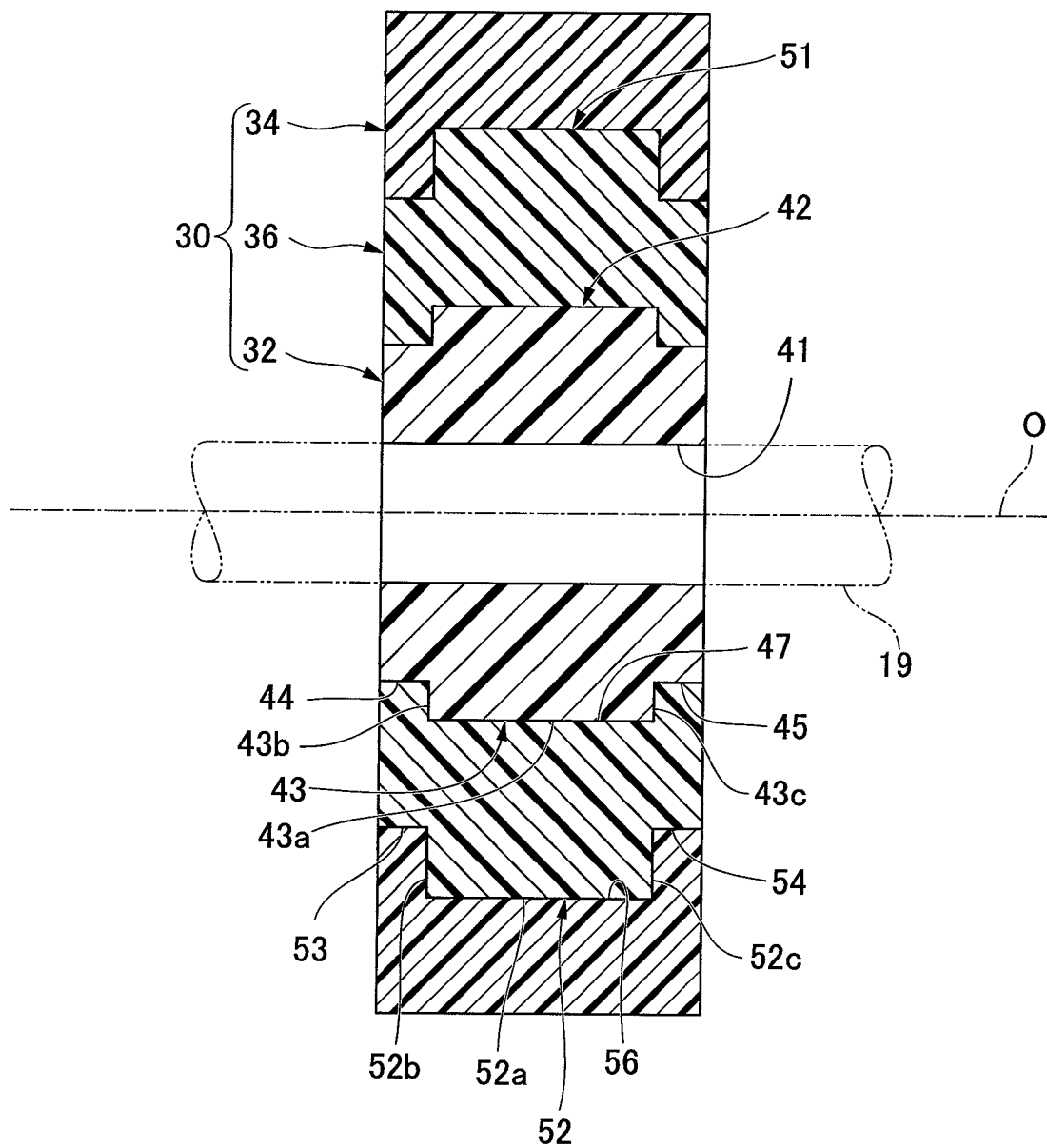
FIG. 6 is a cross-sectional view showing the enveloping layer-coated slide bearing according to a second embodiment of the present invention.

FIG. 6 is a cross-sectional view of an enveloping layer-coated slide bearing 30 according to the second embodiment.

As shown in FIG. 6, the enveloping layer-coated slide bearing 30 includes a slide bearing 32, a second enveloping layer 36 and a first enveloping layer 34. The slide bearing 32, the second enveloping layer 36 and the first enveloping layer 34 are formed coaxially with the axis O of the slide bearing 32.

That is, the second enveloping layer 36 is interposed between the slide bearing 32 and the first enveloping layer 34.

The slide bearing 32 has a bearing surface 41 formed in a cylindrical shape, and an outer circumferential section 42. The bearing surface 41 is formed on an inner circumferential surface of the slide bearing 32 in an arc shape, and rotatably fitted to the support shaft 19. The slide bearing 32 is rotatably supported by the support shaft 19 as a shaft.

The outer circumferential section 42 of the slide bearing 32 has a bearing convex section 43, a first bearing outer circumferential surface 44 and a second bearing outer circumferential surface 45. The bearing convex section 43 protrudes (swells) from a center of the outer circumferential section 42 in the axis O direction toward the outside of the slide bearing 32 in the radial direction. The bearing convex section 43 has a bearing outer circumferential surface 43a, a first bearing side surface 43b and a second bearing side surface 43c.

The bearing outer circumferential surface 43a is formed at an outer side of the bearing convex section 43 in the radial direction of the slide bearing 32. The bearing outer circumferential surface 43a is formed at one end side of the bearing convex section 43. The second bearing side surface 43c is formed at the other end side of the bearing convex section 43.

Like the slide bearing 12 of the first embodiment (FIG. 1), the slide bearing 32 is formed of a plastic such as a hard plastic (amorphous plastic). The amorphous plastic is preferably polycarbonate, ABS resin, an alloy material of the polycarbonate and the ABS resin, or the like.

As the slide bearing 32 is formed of, for example, a hard plastic, wear resistance of the bearing surface 41 with respect to the support shaft 19 can be secured.

A solid lubricant such as polytetrafluoroethylene (tetrafluorinate, PTFE) or the like is preferably added to the hard plastic.

The second enveloping layer 36 is formed on the outer circumferential section 42 of the slide bearing 32 by insert molding (two color formation) through injection molding.

The second enveloping layer 36 is formed of a thermoplastic elastomer (TPE) on the outer circumferential section 42 of the slide bearing 32 through injection molding (two color formation). The thermoplastic elastomer is good in thermal adhesiveness to the amorphous plastic that is a material for the slide bearing 32. Here, polyesters (TPEE) are preferably provided as the thermoplastic elastomer of the second enveloping layer 36. Polyesters are good in wear resistance and mechanical strength, and good in thermal adhesiveness to the hard plastic (i.e., the slide bearing 32). Accordingly, an effect upon two color formation is exhibited. In addition, polyesters (TPEE) are optimal as a material of the second enveloping layer 36 of the enveloping layer-coated slide bearing 10 because they also have low hygroscopicity and a good forming property.

Here, the second enveloping layer 36 is interposed between the slide bearing 32 and the first enveloping layer 34. The second enveloping layer 36 is selectively formed of a material that is good in thermal adhesiveness to both the slide bearing 32 and the first enveloping layer 34. Accordingly, the first enveloping layer 34 is strongly fixed to the outer circumferential section 42 of the slide bearing 32 via the second enveloping layer 36 through thermal fusion.

In addition, the slide bearing 32 has the bearing convex section 43 formed on the outer circumferential section 42. Accordingly, an inner circumferential surface 47 of the second enveloping layer 36 is engaged with the outer circumferential section 42 of the slide bearing 32 in a concavo-convex shape. Accordingly, when a force is applied to the second enveloping layer 36, separation of the second enveloping layer 36 from the outer circumferential section 42 of the slide bearing 32 can be prevented by a concavo-convex structure between the inner circumferential surface 47 of the second enveloping layer 36 and the outer circumferential section 42 of the slide bearing 32.

The second enveloping layer 36 has a coated outer circumferential section 51 formed in a cylindrical shape. The coated outer circumferential section 51 has a coated convex section 52, a first coated outer circumferential surface 53 and a second coated outer circumferential surface 54. The coated convex section 52 protrudes from a center of the coated outer circumferential section 51 in the axis O direction toward the outside of the slide bearing 32 in the radial direction. The coated convex section 52 has a coated outer circumferential surface 52a, a first coated side surface 52b and a second coated side surface 52c.

The coated outer circumferential surface 52a is formed at an outer side of the coated convex section 52 in the radial direction of the slide bearing 32. The first coated side surface 52b is formed at one end side of the coated convex section 52. The second coated side surface 52c is formed at the other end side of the coated convex section 52.

The first enveloping layer 34 is thermally fused to the coated outer circumferential section 51 of the second enveloping layer 36. The first enveloping layer 34 is formed on the coated outer circumferential section 51 of the second enveloping layer 36 in a cylindrical shape. The first enveloping layer 34 is formed of a thermoplastic elastomer (TPE)

on the coated outer circumferential section 51 of the second enveloping layer 36 through injection molding (two color formation).

Like the second enveloping layer 36, polyesters (TPEE) are preferably provided as the thermoplastic elastomer of the first enveloping layer 34.

As the first enveloping layer 34 is formed of the thermoplastic elastomer like the second enveloping layer 36, thermal adhesiveness between the first enveloping layer 34 and the second enveloping layer 36 is increased. In addition, the second enveloping layer 36 is selectively formed of a material that is good in thermal adhesiveness to the first enveloping layer 34. Accordingly, the first enveloping layer 34 is strongly fixed to the coated outer circumferential section 51 of the second enveloping layer 36 through thermal fusion.

In addition, the coated convex section 52 is formed on the coated outer circumferential section 51 of the second enveloping layer 36. Accordingly, an inner circumferential surface 56 of the first enveloping layer 34 is engaged with the coated outer circumferential section 51 of the second enveloping layer 36 in a concavo-convex shape. Accordingly, when a force is applied to the first enveloping layer 34, exfoliation of the first enveloping layer 34 from the coated outer circumferential section 51 of the second enveloping layer 36 can be prevented by a concavo-convex structure between the inner circumferential surface 56 of the first enveloping layer 34 and the coated outer circumferential section 51 of the second enveloping layer 36. Accordingly, separation of the first enveloping layer 34 from the coated outer circumferential section 51 of the second enveloping layer 36 can be securely prevented.

In this way, the second enveloping layer 36 is selectively formed of a material that is good in thermal adhesiveness to both the slide bearing 32 and the first enveloping layer 34. Accordingly, the first enveloping layer 34 is strongly fixed to the outer circumferential section 42 of the slide bearing 32 via the second enveloping layer 36.

Here, the second enveloping layer 36 is formed of a softer material than the slide bearing 32. In addition, the first enveloping layer 34 is formed of a harder material than the second enveloping layer 36.

The soft material is a material having a small bending modulus of elasticity or hardness (for example, duro hardness A (durometer hardness A)).

The hard material is a material having a large bending modulus of elasticity or hardness (for example, duro hardness A (durometer hardness A)).

In this way, the second enveloping layer 36 is formed of a softer material than the slide bearing 32. Further, the first enveloping layer 34 is formed of a harder material than the second enveloping layer 36. As the first enveloping layer 34 is formed of the harder material than the second enveloping layer 36, wear resistance and durability of the first enveloping layer 34 can be secured.

Meanwhile, as the second enveloping layer 36 is formed of a softer material than the slide bearing 32 or the first enveloping layer 34, when the enveloping layer-coated slide bearing 30 is driven, generation of sound (noise) can be minimized by the second enveloping layer 36, and reduction in sound (noise) can be achieved.

Further, while the example in which the slide bearing 32 is formed of, for example, the hard plastic (amorphous plastic) has been exemplarily described in the second embodiment, there is no limitation thereto. As another example, the slide bearing 32 may be formed of, for example, a metal material formed through sintering. A bearing surface (surface) of the slide bearing formed by sintering the metal material is formed to become rough. The melted thermoplastic elastomer is dissolved in the concave section of the bearing surface, and the thermoplastic elastomer can be strongly fixed to the bearing surface by an anchor effect.

In addition, the slide bearing 32 may be formed of a material having a better sliding property, for example, a crystalline material such as polyacetal (POM), polyamide (PA), or the like, or a material having a self-lubricating property. Such a material does not have sufficient thermal adhesiveness to the thermoplastic elastomer. However, as the amorphous material good in thermal adhesiveness to the thermoplastic elastomer is used in the second enveloping layer 36, the first enveloping layer 34 and the second enveloping layer 36 can be strongly fixed.

In addition, since both the slide bearing 32 and the second enveloping layer 36 are plastic, welding between them is generally good. Incidentally, a case in which the welding between the slide bearing 32 and the second enveloping layer 36 is not performed appropriately can be considered. Even in this case, both of the slide bearing 32 and the second enveloping layer 36 are harder than the thermoplastic elastomer, and after formation, the second enveloping layer 36 is contracted inward in the radial direction to be adhered to the slide bearing 32. Accordingly, the second enveloping layer 36 is fixed to the slide bearing 32 by a frictional force between the slide bearing 32 and the second enveloping layer 36.

According to the enveloping layer-coated slide bearing 30 of the second embodiment, the first enveloping layer 34 is strongly fixed to the outer circumferential section 42 of the slide bearing 32 via the second enveloping layer 36. Accordingly, a sandblast machining process or an application process by an adhesive agent, which are necessary in the related art, may be unnecessary. Accordingly, the enveloping layer-coated slide bearing 30 can be manufacturing at a low cost in large quantities.

Third Embodiment

Figure 7:
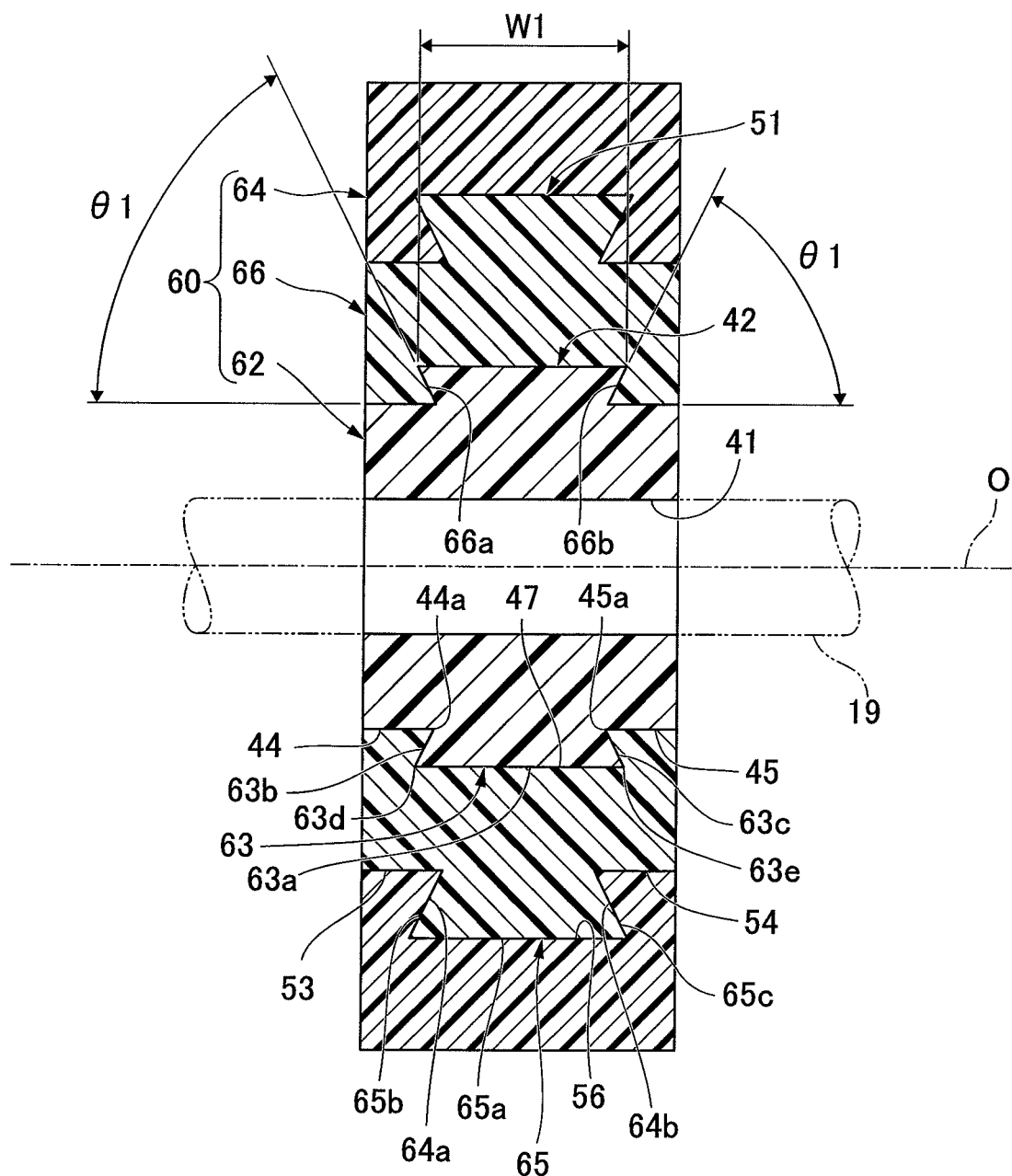
FIG. 7 is a cross-sectional view showing the enveloping layer-coated slide bearing according to a third embodiment of the present invention.

FIG. 7 is a cross-sectional view of an enveloping layer-coated slide bearing 60 according to the third embodiment. Further, in the enveloping layer-coated slide bearing 60 of the third embodiment, the same members as and similar members to the enveloping layer-coated slide bearing 30 of the second embodiment are designated by the same reference numerals and detailed description thereof will be omitted.

As shown in FIG. 7, the enveloping layer-coated slide bearing 60 is obtained by replacing the slide bearing 32 and the second enveloping layer 36 of the second embodiment with a slide bearing 62 and a second enveloping layer 66, and other configurations are the same as those of the enveloping layer-coated slide bearing 30 of the second embodiment. The slide bearing 62 is obtained by replacing the bearing convex section 43 of the second embodiment with a bearing convex section 63.

The bearing convex section 63 has a bearing outer circumferential surface 63a, a first bearing side surface 63b and a second bearing side surface 63c. The first bearing side surface 63b extends from one end 44a of the first bearing outer circumferential surface 44 to one end 63d of the bearing outer circumferential surface 63a in an inclined shape of an inclined angle θ1 from a central side toward the outside of the slide bearing 62 in the axis O direction. The second bearing side surface 63c extends from one end 45a of the second bearing outer circumferential surface 45 to the other end 63e of the bearing outer circumferential surface 63a in an inclined shape of the inclined angle θ1 from a central side toward the outside of the slide bearing 62 in the axis O direction.

The inclined angle θ1 of the first bearing side surface 63b and the second bearing side surface 63c is set to be less than 90 degrees. That is, the bearing convex section 63 is formed such that a widthwise dimension W1 is gradually increased from the slide bearing 62 toward the outside in the radial direction.

The second enveloping layer 66 has a first side surface layer 66a and a second side surface layer 66b. The first side surface layer 66a is formed in an inclined shape to come in contact with the first bearing side surface 63b. The second side surface layer 66b is formed in an inclined shape to come in contact with the second bearing side surface 63c.

Accordingly, when the second enveloping layer 66 is contracted by cooling, the first side surface layer 66a can appropriately bite into the first bearing side surface 63b. In addition, the second side surface layer 66b can appropriately bite into the second bearing side surface 63c. Accordingly, the second enveloping layer 66 is more strongly fixed to the bearing convex section 63 (i.e., the slide bearing 62).

In addition, like the bearing convex section 63, the second enveloping layer 66 has a coated convex section 65 with a first coated side surface 65b and a second coated side surface 65c that are formed in an inclined shape.

Accordingly, when a first enveloping layer 64 is contracted through cooling, a first side surface layer 64a can appropriately bite into the first coated side surface 65b. In addition, a second side surface layer 64b can appropriately bite into the second coated side surface 65c. Accordingly, the first enveloping layer 64 is more strongly fixed to the coated convex section 65 (i.e., the second enveloping layer 66).

In addition, even when a force in the axis O direction or a force in a direction turned from the second enveloping layer 66 is applied to the first enveloping layer 64, exfoliation of the first enveloping layer 64 from the second enveloping layer 66 may not easily occur.

Further, while the example in which the first bearing side surface 63b and the second bearing side surface 63c of the bearing convex section 63 are formed in an inclined shape and the first coated side surface 65b and the second coated side surface 65c of the coated convex section 65 are formed in an inclined shape has been described in the enveloping layer-coated slide bearing 60 according to the third embodiment, there is no limitation thereto. As another example, any one of the bearing convex section 63 and the coated convex section 65 may also be formed in an inclined shape. In particular, it is preferable that when only the coated convex section 65 is formed in an inclined shape, exfoliation of the first enveloping layer 64 from the second enveloping layer 66 may not easily occur.

Fourth Embodiment

Figure 8:
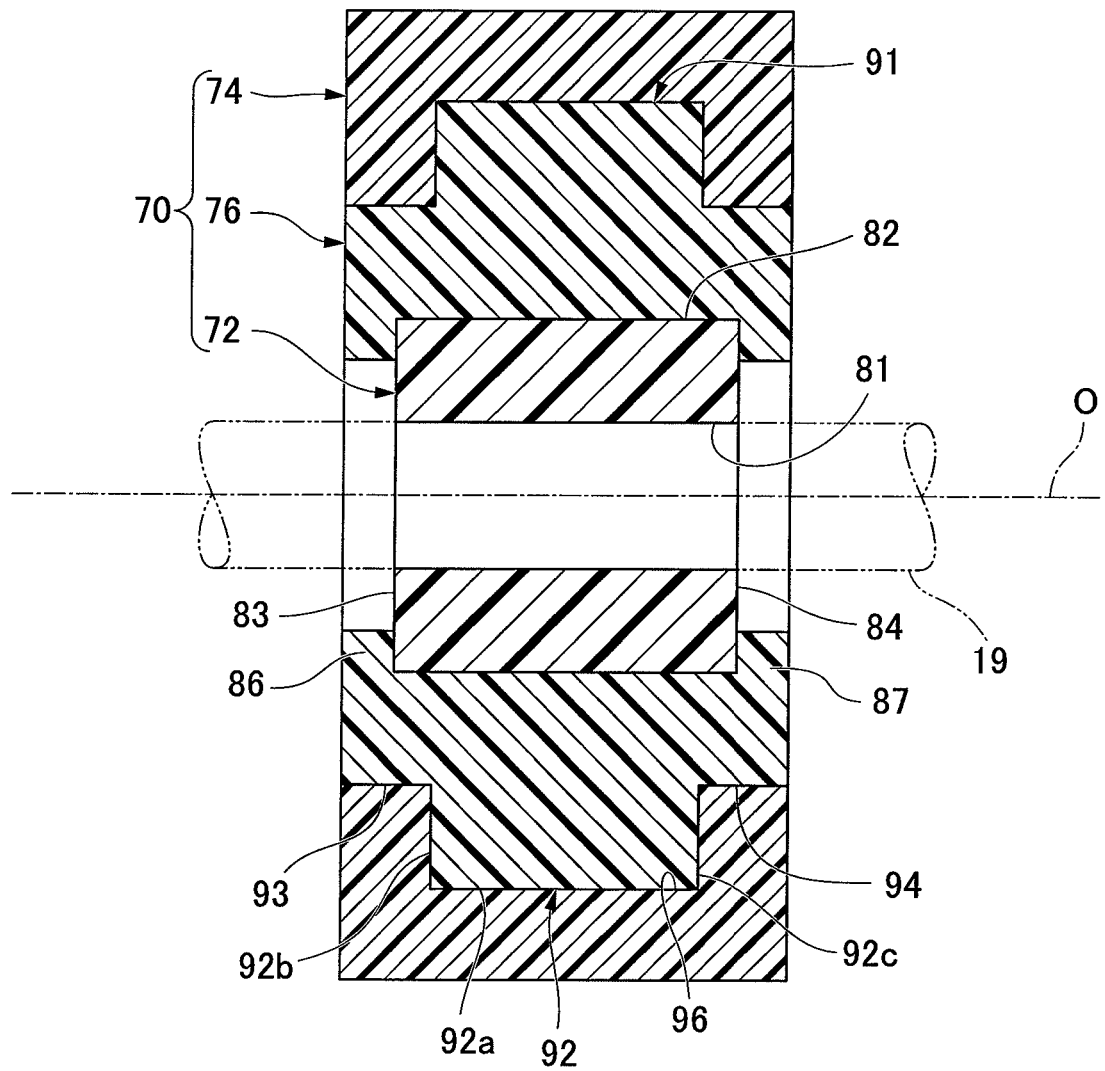
FIG. 8 is a cross-sectional view showing the enveloping layer-coated slide bearing according to a fourth embodiment of the present invention.

FIG. 8 is a cross-sectional view of an enveloping layer-coated slide bearing 70 according to the fourth embodiment.

As shown in FIG. 8, the enveloping layer-coated slide bearing 70 includes a slide bearing 72, a second enveloping layer 76 and a first enveloping layer 74. The slide bearing 72, the second enveloping layer 76 and the first enveloping layer 74 are formed coaxially with the axis O of the slide bearing 72.

That is, the second enveloping layer 76 is interposed between the slide bearing 72 and the first enveloping layer 74.

Like the slide bearing 12 of the first embodiment, the slide bearing 72 is formed of a plastic such as a hard plastic (amorphous plastic). The amorphous plastic may be preferably polycarbonate, ABS resin, an alloy material of the polycarbonate and the ABS resin, or the like.

As the slide bearing 72 is formed of, for example, a hard plastic, wear resistance of a bearing surface 81 with respect to the support shaft 19 can be secured.

A solid lubricant such as polytetrafluoroethylene (tetrafluorinate, PTFE) or the like is desirably added to the hard plastic.

The second enveloping layer 76 is formed on an outer circumferential surface 82, a first side surface 83 and a second side surface 84 of the slide bearing 72. The second enveloping layer 76 is thermally fused to the outer circumferential surface 82, the first side surface 83 and the second side surface 84 of the slide bearing 72 by insert molding through injection molding.

Like the second enveloping layer 36 of the second embodiment (FIG. 6), the second enveloping layer 76 is formed of a thermoplastic elastomer (TPE) on the outer circumferential surface 82, the first side surface 83 and the second side surface 84 of the slide bearing 72 through injection molding (two color formation).

The thermoplastic elastomer is good in thermal adhesiveness to the amorphous plastic that is a material for the slide bearing 72. Here, polyesters (TPEE) are preferably provided as the thermoplastic elastomer of the second enveloping layer 36. Polyesters are good in a wear resistance and mechanical strength and also good in thermal adhesiveness to a hard plastic (i.e., the slide bearing 32).

Accordingly, an effect upon two color formation is exhibited. In addition, the polyesters (TPEE) are optimal as a material for the second enveloping layer 76 of the enveloping layer-coated slide bearing 70 because they also have low hygroscopicity is and a good forming property.

Here, the second enveloping layer 76 is interposed between the slide bearing 72 and the first enveloping layer 74. Accordingly, the second enveloping layer 76 is selectively formed of a material that is good in thermal adhesiveness to both the slide bearing 72 and the first enveloping layer 74. Accordingly, the first enveloping layer 74 is more strongly fixed to the outer circumferential surface 82, the first side surface 83 and the second side surface 84 of the slide bearing 72 via the second enveloping layer 36 through thermal fusion.

The second enveloping layer 76 has a first wall section 86 and a second wall section 87. The first wall section 86 is thermally fused to a portion of the first side surface 83 in the slide bearing 72. The second wall section 87 is thermally fused to a portion of the second side surface 84 in the slide bearing 72. Accordingly, the second enveloping layer 76 and the slide bearing 72 are engaged with each other in a concavo-convex shape. Accordingly, when a force is applied to the second enveloping layer 76, separation of the second enveloping layer 76 from the slide bearing 72 can be prevented by a concavo-convex structure between the second enveloping layer 76 and the slide bearing 72.

The second enveloping layer 76 has a coated outer circumferential section 91 formed in a cylindrical shape. Like the coated outer circumferential section 51 of the second embodiment, the coated outer circumferential section 91 has a coated convex section 92, a first coated outer circumferential surface 93 and a second coated outer circumferential surface 94. The coated convex section 92 protrudes (swells) from a center of the coated outer circumferential section 91 in the axis O direction toward the outside of the slide bearing 72 in the radial direction. The coated convex section 92 has a coated outer circumferential surface 92a, a first coated side surface 92b and a second coated side surface 92c.

The first enveloping layer 74 is thermally fused to the coated outer circumferential section 91 of the second enveloping layer 76. The first enveloping layer 74 is formed on the coated outer circumferential section 91 of the second enveloping layer 76 in a cylindrical shape. The first enveloping layer 74 is formed of the thermoplastic elastomer (TPE) on the coated outer circumferential section 91 of the second enveloping layer 76 through injecting molding (two color formation).

Like the second enveloping layer 76, polyesters (TPEE) are preferably provided as the thermoplastic elastomer of the first enveloping layer 34.

As the first enveloping layer 74 is formed of the thermoplastic elastomer like the second enveloping layer 36, thermal adhesiveness between the first enveloping layer 74 and the second enveloping layer 76 is increased. In addition, the second enveloping layer 76 is selectively formed of a material that is good in thermal adhesiveness to the first enveloping layer 74. Accordingly, the first enveloping layer 74 is strongly fixed to the coated outer circumferential section 91 of the second enveloping layer 76 through thermal fusion.

In addition, the coated convex section 92 is formed on the coated outer circumferential section 91 of the second enveloping layer 76. Accordingly, an inner circumferential surface 96 of the first enveloping layer 74 is engaged with the coated outer circumferential section 91 of the second enveloping layer 76 in a concavo-convex shape. Accordingly, when a force is applied to the first enveloping layer 74, exfoliation of the first enveloping layer 74 from the coated outer circumferential section 91 of the second enveloping layer 76 can be prevented by a concavo-convex structure between the inner circumferential surface 96 of the first enveloping layer 74 and the coated outer circumferential section 91 of the second enveloping layer 76. Accordingly, separation of the first enveloping layer 74 from the coated outer circumferential section 91 of the second enveloping layer 76 can be securely prevented.

In this way, the second enveloping layer 76 is selectively formed of a material that is good in thermal adhesiveness to both the slide bearing 72 and the first enveloping layer 74. Accordingly, the first enveloping layer 74 is strongly fixed to the slide bearing 72 via the second enveloping layer 76.

Here, the second enveloping layer 76 is formed of a softer material than the slide bearing 72. In addition, the first enveloping layer 74 is formed of a harder material than the second enveloping layer 76.

The soft material is a material having a small bending modulus of elasticity or hardness (for example, duro hardness A (durometer hardness A)).

The hard material is a material having a large bending modulus of elasticity or hardness (for example, duro hardness A (durometer hardness A)).

In this way, the second enveloping layer 76 is formed of a softer material than the slide bearing 72. Further, the first enveloping layer 74 is formed of a harder material than the second enveloping layer 76. As the first enveloping layer 74 is formed of the harder material than the second enveloping layer 76, wear resistance and durability of the first enveloping layer 74 can be secured.

Meanwhile, as the second enveloping layer 76 is formed of the softer material than the slide bearing 72 or the first enveloping layer 74, when the enveloping layer-coated slide bearing 70 is driven, generation of sound (noise) can be minimized by the second enveloping layer 76, and reduction in sound (noise) can be achieved.

Further, while the example in which the slide bearing 72 is formed of, for example, the hard plastic (amorphous plastic) has been exemplarily described in the fourth embodiment, there is no limitation thereto. As another example, the slide bearing 72 may be formed of, for example, a metal material formed by sintering. A bearing surface (surface) of the slide bearing formed by sintering the metal material is formed to become rough. The melted thermoplastic elastomer is dissolved in the concave section of the bearing surface, and the thermoplastic elastomer can be strongly fixed to the bearing surface by an anchor effect.

In addition, the slide bearing 72 may be formed of a material having a better sliding property, for example, a crystalline material such as polyacetal (POM), polyamide (PA), or the like, or a material having a self-lubricating property. Such a material does not have sufficient thermal adhesiveness to the thermoplastic elastomer. However, as the amorphous material good in thermal adhesiveness to the thermoplastic elastomer is used in the second enveloping layer 76, the first enveloping layer 74 and the second enveloping layer 76 can be strongly fixed.

In addition, since both the slide bearing 72 and the second enveloping layer 76 are plastic, welding between them is generally good. Incidentally, a case in which the welding between the slide bearing 72 and the second enveloping layer 76 is not performed appropriately can be considered. Even in this case, both the slide bearing 72 and the second enveloping layer 76 are harder than the thermoplastic elastomer, and after formation, the second enveloping layer 76 is contracted inward in the radial direction to be adhered to the slide bearing 72. Accordingly, the second enveloping layer 76 is fixed to the slide bearing 72 by a frictional force between the slide bearing 72 and the second enveloping layer 76.

According to the enveloping layer-coated slide bearing 70 of the fourth embodiment, the first enveloping layer 74 is strongly fixed to the slide bearing 72 via the second enveloping layer 76. Accordingly, a sandblast machining process or an application process of an adhesive agent, which is necessary in the related art, may be unnecessary. Accordingly, the enveloping layer-coated slide bearing 70 can be manufactured at a low cost in large quantities.

Fifth Embodiment

Figure 9:
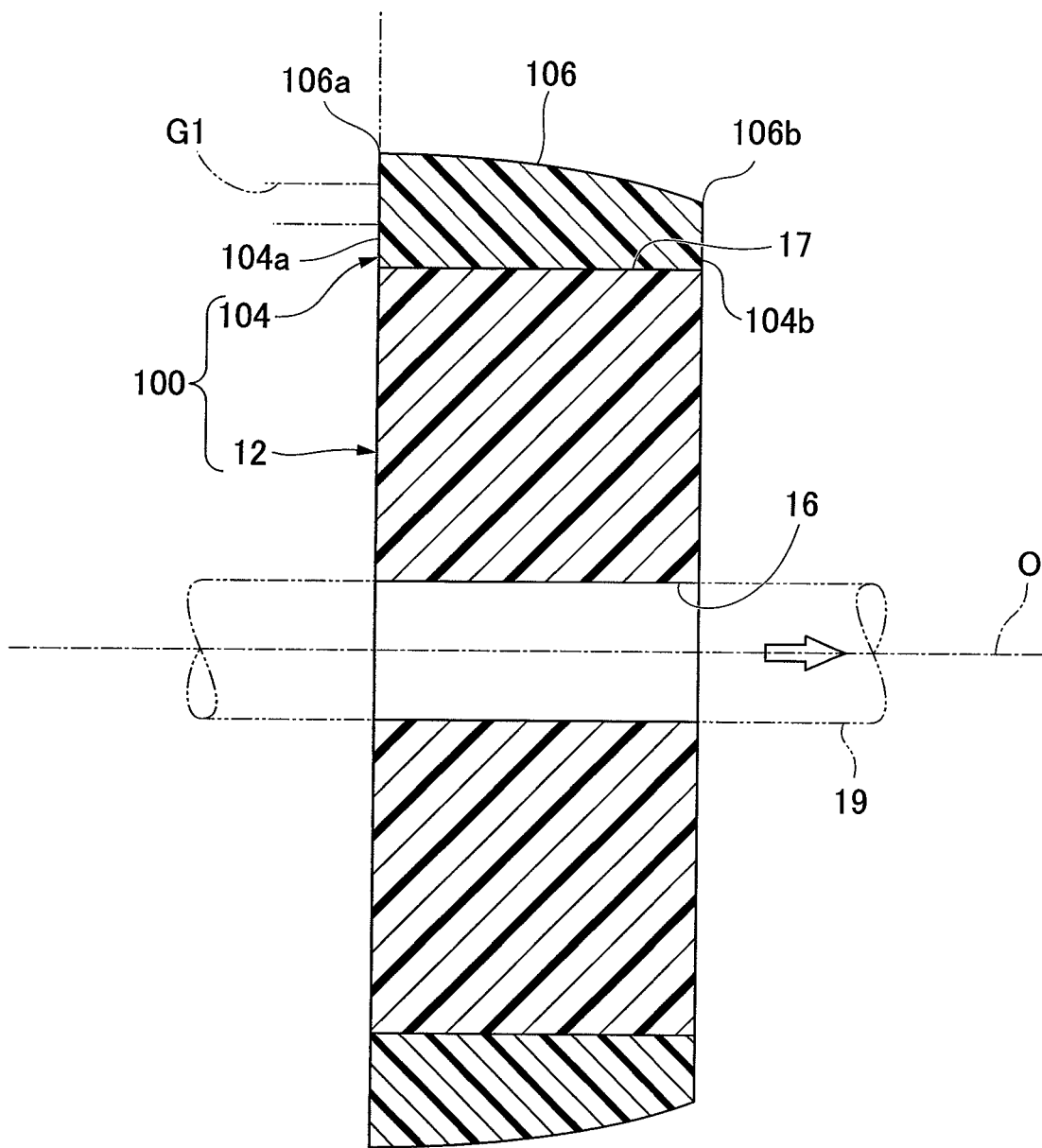
FIG. 9 is a cross-sectional view showing the enveloping layer-coated slide bearing according to a fifth embodiment of the present invention.

FIG. 9 is a cross-sectional view of an enveloping layer-coated slide bearing 100 according to the fifth embodiment.

As shown in FIG. 9, the enveloping layer-coated slide bearing 100 is obtained by replacing the first enveloping layer 14 of the first embodiment with a first enveloping layer 104, and other configurations are similar to those of the enveloping layer-coated slide bearing 10 of the first embodiment. The first enveloping layer 104 is obtained by replacing the coated outer circumferential surface 18 of the first embodiment with a coated outer circumferential surface 106.

The coated outer circumferential surface 106 has a first end portion 106a and a second end portion 106b. The first end portion 106a is an end portion at which a first coated side surface 104a and the coated outer circumferential surface 106 cross each other. The second end portion 106b is an end portion at which a second coated side surface 104*b* and the coated outer circumferential surface 106 cross each other. The coated outer circumferential surface 106 is formed in a curved shape such that an outer diameter is gradually reduced from the first end portion 106*a* to the second end portion 106*b*. The coated outer circumferential surface 106 may be formed in a linear shape in which an outer diameter is gradually reduced.

A parting line PL of the mold is disposed on the first end portion 106*a*. That is, the coated outer circumferential surface 106 is formed in a curved shape such that an outer diameter is gradually reduced from the parting line PL to the second end portion 106*b*. Accordingly, after the first enveloping layer 104 is insert-molded, as a movable die of the mold is opened in an arrow direction, generation of burrs on the coated outer circumferential surface 106 can be minimized.

Accordingly, after the first enveloping layer 104 is insert-molded on the outer circumferential surface 17 of the slide bearing 12, post processing of removing burrs from the coated outer circumferential surface 106 may be unnecessary.

The outer diameter of the coated outer circumferential surface 106 is formed to be gradually reduced. Accordingly, when a bill, a ticket, or the like, is conveyed by the coated outer circumferential surface 106 or when the coated outer circumferential surface 106 is moved while rolling on the contact object 5 (see FIG. 5), a contact area with the bill, the ticket, the contact object 5, or the like, can be minimized to a small level. Accordingly, when a bill, a ticket, or the like, is conveyed by the coated outer circumferential surface 106 or when the coated outer circumferential surface 106 is moved while rolling on the contact object 5, an effect of reducing sound (noise) is obtained.

According to the enveloping layer-coated slide bearing 100 of the fifth embodiment, like the enveloping layer-coated slide bearing 10 of the first embodiment, the first enveloping layer 104 is strongly fixed to the slide bearing 12 through thermal fusion. Accordingly, a sandblast machining process or an application process of an adhesive agent, which is necessary in the related art, may be unnecessary. Accordingly, the enveloping layer-coated slide bearing 100 can be manufactured at a low cost in large quantities.

(Variant)

Figure 10:
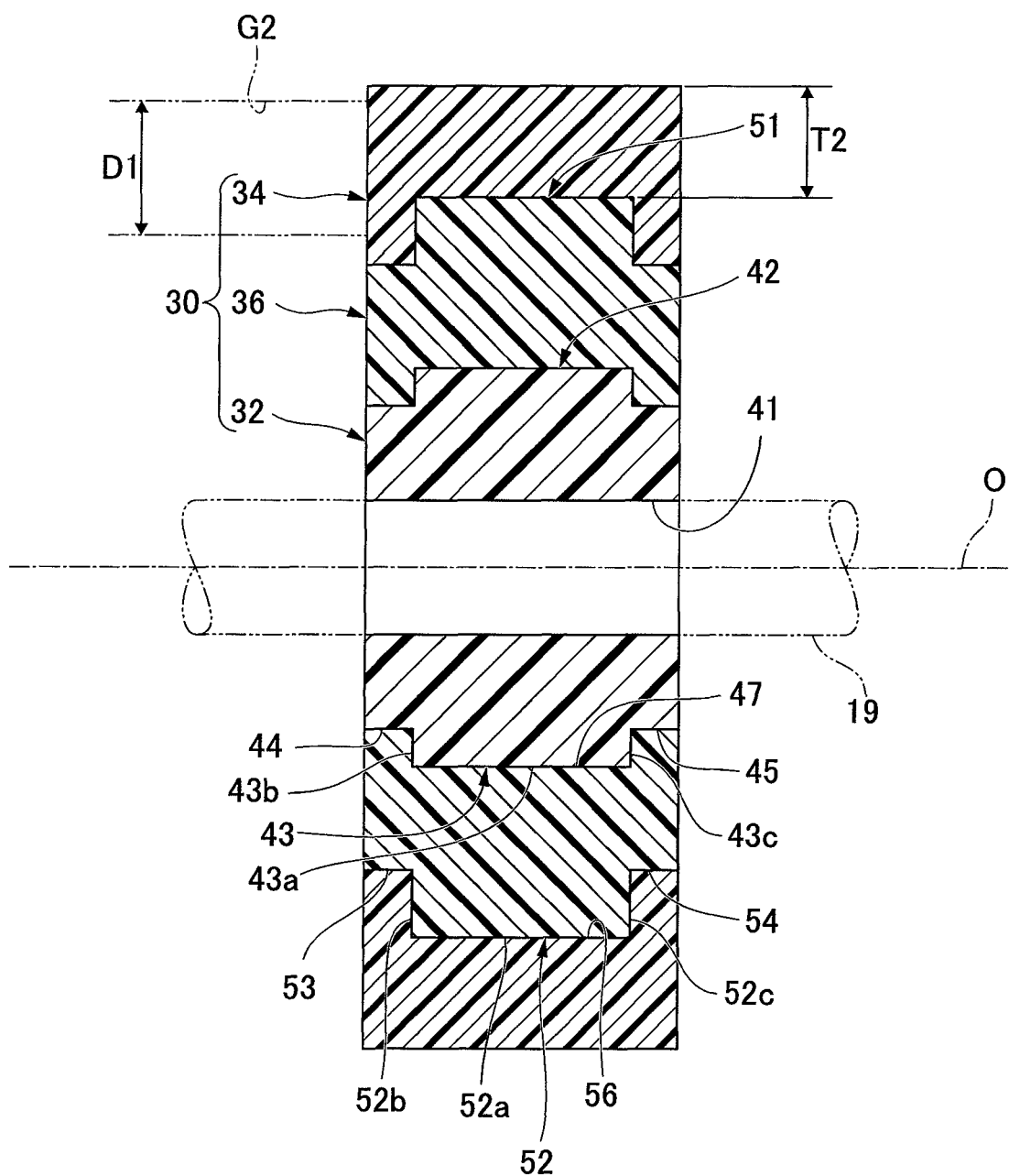
FIG. 10 is a cross-sectional view showing a variant according to the embodiment of the present invention.

FIG. 10 is a cross-sectional view of a bearing of a variant according to the embodiment of the present invention.

As shown in FIG. 10, the first enveloping layer 34 of the enveloping layer-coated slide bearing 30 can also be formed of a thermoplastic elastomer filled from a gate G2 having a large gate diameter D1.

The gate G2 is opened to have the gate diameter D1 that is larger than a thickness dimension T2 of the first enveloping layer 34 in the radial direction of the enveloping layer-coated slide bearing 30. Further, the gate G2 is disposed to overlap both the second enveloping layer 36 and the first enveloping layer 34 in an axial direction.

As the inside (a cavity) of the mold is filled with the thermoplastic elastomer from the gate G2, the first enveloping layer 34 is insert-molded on the coated outer circumferential section 51 of the second enveloping layer 36.

As the gate diameter D1 of the gate G2 is formed to be large and the gate G2 is disposed to overlap both the second enveloping layer 36 and the first enveloping layer 34, even when the thickness dimension T2 of the first enveloping layer 34 is reduced, the first enveloping layer 34 can be appropriately formed.

Further, the coated outer circumferential section 51 of the second enveloping layer 36 can be filled with the thermoplastic elastomer at a high pressure. Accordingly, an adhesive force of both the second enveloping layer 36 and the first enveloping layer 34 can be increased.

While the example in which the first enveloping layer 34 of the enveloping layer-coated slide bearing 30 is formed through the gate G2 having the large gate diameter D1 has been described in the variant, there is no limitation thereto. As another example, for example, the first enveloping layers 64 and 74 of the enveloping layer-coated slide bearings 60 and 70 may be formed through the gate G2 having the large gate diameter D1.

Further, the technical scope of the present invention is not limited to the above-mentioned embodiments and various modifications may be made without departing from the spirit of the present invention.

While the examples in which the widthwise dimensions of the enveloping layers 14, 34, 36, 66, 64, 76, 74 and 104 are set to the same as the widthwise dimension of the slide bearing 12 have been described in the first embodiment to the fifth embodiment, there is no limitation thereto. As another example, for example, the widthwise dimensions of the enveloping layers 14, 34, 36, 66, 64, 76, 74 and 104 are set to be smaller than that of the slide bearing 12. Hereinafter, the enveloping layers 14, 34, 36, 66, 64, 76, 74 and 104 are abbreviated as "the enveloping layers 14 . . . ."

Since the widthwise dimension of the enveloping layers 14 . . . is decreased, reduction in sound (noise) can be achieved by decreasing a use amount of a material that forms the enveloping layers 14 . . . and reducing contact areas of the outer circumferential surfaces of the enveloping layers 14 . . . .

In addition, in the first embodiment to the fifth embodiment, groove sections or recessed sections may be formed in the outer circumferential surfaces 17 and 87 of the slide bearings 12 and 72, the outer circumferential sections 42 of the slide bearings 32 and 62, and the coated outer circumferential sections 51 and 91 of the second enveloping layers 36, 66 and 76. For example, the groove sections are formed to extend in the axial direction of the slide bearing. As the groove sections or the recessed sections are formed in the outer circumferential surfaces 17 and 87, the outer circumferential sections 42 and the coated outer circumferential sections 51 and 91, adhesive strength of the enveloping layer to the outer circumferential surfaces 17 and 87, the outer circumferential sections 42 and the coated outer circumferential sections 51 and 91 can be increased.

Further, in the second embodiment to the fifth embodiment, like the variant of the first embodiment, a configuration in which the first concave sections are formed in both side portions of the slide bearings 32, 62 and 72 and grease is accumulated in the first concave sections may be provided.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An enveloping layer-coated slide bearing comprising:
    a slide bearing having a bearing surface formed in a cylindrical shape; and an enveloping layer composed of a thermoplastic elastomer formed on, and in direct contact with, an outer circumferential surface of the slide bearing.

2. The enveloping layer-coated slide bearing according to claim 1, wherein the slide bearing is formed of polycarbonate, ABS resin, or an alloy material of the polycarbonate and the ABS resin.

3. A drive module comprising the enveloping layer-coated slide bearing according to claim 1.

4. The enveloping layer-coated slide bearing according to claim 1, wherein a wall thickness of the slide bearing in a radial direction is greater than a thickness of the enveloping layer in the radial direction.

5. The enveloping layer-coated slide bearing according to claim 4, wherein the thickness of the enveloping layer is less than 1.0 mm.

6. The enveloping layer-coated slide bearing according to claim 1, wherein the enveloping layer is thermally fused to the outer circumferential surface of the slide bearing.

7. The enveloping layer-coated slide bearing according to claim 1, wherein the outer circumferential surface of the slide bearing has a cylindrical shape.

8. The enveloping layer-coated slide bearing according to claim 1, wherein the enveloping layer has an outer diameter that gradually reduces from one end to an other end in an axial direction of the slide bearing.

9. A drive module having a main body section, and wheels rotatably mounted to the main body section, wherein the wheels each comprise an enveloping layer-coated slide bearing according to claim 1.

10. An enveloping layer-coated slide bearing comprising:
a slide bearing having a bearing surface formed in a cylindrical shape;
a first enveloping layer composed of a thermoplastic elastomer surrounding an outer circumferential surface of the slide bearing; and
a second enveloping layer interposed between the outer circumferential surface of the slide bearing and the first enveloping layer, the second enveloping layer being in direct contact with the outer circumferential surface of the slide bearing.

11. The enveloping layer-coated slide bearing according to claim 10, wherein the second enveloping layer is formed of a softer material than the slide bearing, and
the first enveloping layer is formed of a harder material than the second enveloping layer.

12. The enveloping layer-coated slide bearing according to claim 10, wherein a convex section swelling outward in a radial direction is provided on an outer circumferential surface of one of the slide bearing and the second enveloping layer, on which the first enveloping layer is formed, at a center in an axial direction.

* * * * *